United States Patent
Chang et al.

(10) Patent No.: US 7,953,244 B2
(45) Date of Patent: May 31, 2011

(54) SYSTEM INTEGRATING MACHINE VISION, INTERACTIVE MODULE AND REHABILITATION EQUIPMENT

(75) Inventors: Chia-Chang Chang, Taichung (TW); Wei-Lung Chen, Taichung County (TW); Tzu-Peng Chiang, Changhua County (TW)

(73) Assignee: Cycling & Health Tech Industry, Taichung Industry Park R & D Center, Taichung (TW)

( * ) Notice: Subject to any disclaimer, the term of this patent is extended or adjusted under 35 U.S.C. 154(b) by 942 days.

(21) Appl. No.: 11/897,813

(22) Filed: Aug. 31, 2007

(65) Prior Publication Data

US 2009/0063056 A1    Mar. 5, 2009

(51) Int. Cl.
*G06K 9/00* (2006.01)
*G01N 33/48* (2006.01)
*G06G 7/58* (2006.01)

(52) U.S. Cl. .............................. 382/100; 702/19; 703/11

(58) Field of Classification Search .................. 382/100; 482/4, 5, 8, 121, 146; 585/311, 406, 710, 585/826, 900, 901, 904; 702/19, 139; 703/2, 6, 11

See application file for complete search history.

(56) References Cited

U.S. PATENT DOCUMENTS 5,255,211 A * 10/1993 Redmond .......................... 703/6
5,538,486 A *  7/1996 France et al. ..................... 482/8

* cited by examiner

*Primary Examiner* — Abolfazl Tabatabai
(74) *Attorney, Agent, or Firm* — Charles E. Baxley

(57) ABSTRACT

A system integrating machine vision, interactive module and rehabilitation equipment primarily comprises a rehabilitation equipment, at least one image-capture device for continuously capturing images of specific limbs or a trunk of a user operating the rehabilitation equipment so as to generate digital image data, and a machine vision recognition unit for processing the digital image data into characteristic image data that can be analyzed and applied by a host computer belonging to the machine vision recognition unit. Then, the host computer can transform the characteristic image data into direction signals and velocity signals with respect to movements of the user's limbs and trunk and afterward output the signals to an interactive module.

16 Claims, 1 Drawing Sheet

SYSTEM INTEGRATING MACHINE VISION, INTERACTIVE MODULE AND REHABILITATION EQUIPMENT

BACKGROUND OF THE INVENTION

1. Technical Field

The present invention relates to rehabilitation equipments, and more particularly, to a system integrating an existing equipment having rehabilitation functions with a machine vision module without any substantial modification of the equipment so that the equipment can be further connected to an interactive module through the machine vision module for interacting with an interactive software in the interactive module.

2. Description of Related Art

When people get injured from diseases or accidents and have their physical activity detrimentally affected, they may recover the activity of their limbs to an anticipative recovery level efficiently under assistance of rehabilitation equipments in addition to internal/surgical medical treatment. However, traditional rehabilitation treatment may be uncomfortable experience to many people who participate the rehabilitation treatment, such as patients, rehabilitation engineers and companions because they have to face emotionless rehabilitation equipments and focus their attention on repeated, monotonous as well as dull rehabilitation courses to be practiced. Besides, the discouragement coming along with pains or failure in meeting the anticipative recovery level may be magnified due to the patients and other participators' excessive attention. This would be the major reason for the facts that the patients and the participators lose their willing to persevere with and even discontinue their rehabilitation treatment.

Many medical and rehabilitation institutions have noted these problems and endeavor to mitigate the painful feeling rendered by rehabilitation treatment and to enhance the efficiency of rehabilitation treatment. The most direct and essential way therein is to improve the rehabilitation equipments. Thus, some rehabilitation equipments integrated with interactive modules have been developed and adopted. For example, a rehabilitation equipment may be provided with one or more sensing devices for sensing movements of the rehabilitation equipment operated by a user and transforming these movements into expressive digital signals to be transmitted to an interactive module. Then when the digital signals behave in interactive software of the interactive module, the user can operate the rehabilitation equipment in responding to a series of situational scenes produced by the interactive software according to the digital signals. As a result, the operation of the rehabilitation equipment is added with interest so as to stimulate the user's usage intention. The aforementioned sensing devices are typically immovably installed on the rehabilitation equipment and communicated with the interactive module through a specific interface for data transmission. Further, the interactive software provided by the interactive module is exclusively designed for the particular rehabilitation equipment. Such conventional interactive module and sensing devices are integrated on the particular rehabilitation equipment and are not compatible with an originally existing rehabilitation equipment. It means that medical and rehabilitation institutions may have to replace their old rehabilitation equipments with new ones or they may have to structurally modify their old rehabilitation equipments in order to connect the same with the interactive modules. Either of the above manners can consume considerable costs and make the modified rehabilitation equipments unacceptable to medical and rehabilitation institutions in the financial perspective.

SUMMARY OF THE INVENTION

The present invention relates to rehabilitation equipments, and more particularly, to a system integrating existing equipment having rehabilitation functions with a machine vision module without any substantial modification of the equipment so that the equipment can be further connected to an interactive module through the machine vision module for interacting with an interactive software in the interactive module. The sensed object of the machine vision module is a "user" operating the rehabilitation equipment, but not the rehabilitation equipment itself. Similarly, direction signals and velocity signals transmitted to the interactive module are related to the "user", but not the rehabilitation equipment itself. Thus, it is understood that a competent user of the disclosed subject matter must have the abilities of actively moving his/her limbs or trunk, and actively operating the rehabilitation equipment.

To achieve these and other objectives of the present invention, the system integrating machine vision, interactive module and rehabilitation equipment primarily comprises a rehabilitation equipment, at least one image-capture device for continuously capturing images of specific limbs or a trunk of a user operating the rehabilitation equipment so as to generate digital image data, and a machine vision recognition unit for processing the digital image data into characteristic image data that can be analyzed and applied by a host computer belonging to the machine vision recognition unit. Then, the host computer can transform the characteristic image data into direction signals and velocity signals with respect to movements of the user's limbs and trunk and afterward output the signals to an interactive module.

It is one objective of the present invention to provide a system integrating a machine vision module with an existing rehabilitation equipment, wherein the machine vision module contains an image-capture device and a machine vision recognition unit. Thereupon, the rehabilitation equipment can be connected to an interactive module through the machine vision module without any structural modification thereof.

It is another objective of the present invention to provide a system implementing a machine vision module to integrate an existing rehabilitation with an interactive module so that a user can be trained on his/her limb activity by operating the rehabilitation equipment. Besides, the movements of the user's limbs can be further provided into an interactive software belonging to the interactive module so that the user can then operate the rehabilitation equipment in responding to a series of situational scenes provided by the interactive software. Thereupon, the traditional monotony, dull and insipid rehabilitation treatment can be turned into an entertaining challenge, which can efficiently facilitate mitigating misery caused by rehabilitation treatment, stimulating the users' spontaneous intention of rehabilitation treatment and enhancing the effects of rehabilitation treatment.

It is another objective of the present invention to provide a system that implements a machine vision module to transform movements of limbs of a user operating the rehabilitation equipment into direction signals and velocity signals to be transmitted to an interactive module. Therein, the sensed object is the "user" operating the rehabilitation equipment, but not the rehabilitation equipment. Consequently, the direction and velocity signals transmitted to the interactive module are related to the movements of the user's limbs, but not the rehabilitation equipment.

It is another objective of the present invention to provide a system that integrates a machine vision module and an interactive module into an independent apparatus wherein the interactive module is equipped with various interactive software units (e.g. balance training unit, lower-limb training unit, upper-limb training unit, etc.) to cooperate with various rehabilitation equipments (e.g. balance training machine, lower-limb training machine, upper-limb training machine, etc.). Thus, the machine vision module and interactive module are not exclusively compatible with a particular rehabilitation equipment. In other words, the machine vision module and interactive module can be maneuverably coordinate with various rehabilitation equipments as a facile system. Since the machine vision module and interactive module can be applied to an existing rehabilitation equipment, the old rehabilitation equipments can be preserved and continuously used and the costs for purchasing new rehabilitation equipments can be significantly reduced. Consequently, a purchaser, such as a medical institution or a rehabilitation institution, may be more willing to upgrade the existing rehabilitation equipment by purchasing the disclosed subject matter so that people who need rehabilitation treatment can be beneficial.

It is another objective of the present invention to provide a system having an interactive module with extendable interactive software units, so that the compatibility of the interactive module with respect to rehabilitation equipments can be enhanced by extending the interactive module. Therefore, to a manufacturer, there is no need to modify the rehabilitation equipments or to adjust hardware of the present invention in accordance with diverse rehabilitation equipments, resulting in cost-saving manufacture.

It is yet another objective of the present invention to provide a system integrating machine vision, interactive module and rehabilitation equipment which can also act as an exercise training apparatus.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
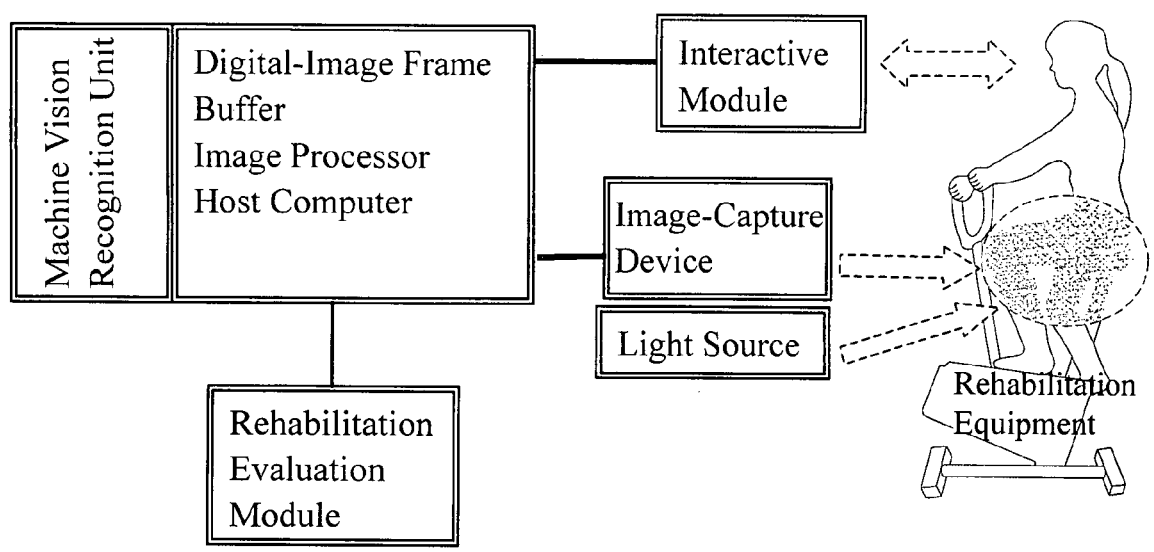
FIG. 1 is a schematic drawing illustrating the disclosed system of the present invention.

A system integrating machine vision, interactive module and rehabilitation equipment primarily comprises the following components.

A rehabilitation equipment allows a user to reciprocally move specific limbs or trunk thereby in an active way.

At least one image-capture device is capable of continuously capturing images of the specific limbs or a trunk of a user using the rehabilitation equipment so as to generate digital image data. The image-capture device may be immovably installed on the rehabilitation equipment or at a fixed position around the rehabilitation equipment. Alternatively, the image-capture device may be installed on a machine robot and move with the machine robot.

At lease one light source provides light to where the image-capture device is capturing images for, so that the captured images can be made with enhanced contrast and better image details. The light source can be an environmental light source or any other external light source settled at a fixed position around the rehabilitation equipment. Alternatively, the external light source can be also installed on a machine robot so as to move along with the image-capture device.

A machine vision recognition unit primarily comprises a digital-image frame buffer, an image processor and a host computer. The digital-image frame buffer is provided for storing the digital image data captured by the image-capture device. The image processor transfers problems about the digital images that can not be solved in the spatial domain to frequency domain for being processing and analysis, such as edge enhancement, high-low pass filter, eigenvalue extraction, search and statistics, thinning, etc, to generate characteristic image data so as to facilitate the image analysis and utilization on the host computer. A processor of the host computer uses the characteristic image data to generate direction signals and velocity signals with respect to movements of the user's limbs and trunk and afterward outputs the signals to an interactive module.

The interactive module receives and processes the direction signals and velocity signals outputted by the machine vision recognition unit so as to present the signals to an interactive software unit of the interactive module. The interactive software unit provides a series of situational scenes, and a subject matter shown in the scenes is controlled by the movements of the user operating the rehabilitation equipment. Therefore, the user can take movements and locations of the subject matter in the scenes as reference to operate the rehabilitation equipment accordingly. The interactive module further comprises multiple interactive software units, such as balance training unit, lower-limb training unit, upper-limb training unit, etc., so that the user can select suitable interactive software according to the implemented rehabilitation equipment.

Finally, a rehabilitation evaluation module at least comprising a user data input and process unit, a rehabilitation function menu unit and a recovery level evaluation unit may be provided to the system. The user data input and process unit processes and stores a user' personal information and physical status inputted therein. The rehabilitation function menu unit is provided for selecting one of the interactive software units. The recovery level evaluation unit analyzes and compares the direction signals and velocity signals output by the machine vision recognition unit and the interactive performance between the signals and the interactive software. Then the recovery level evaluation unit analyzes the comparison results for recording or outputting so that a rehabilitation engineer can monitor the user's rehabilitation results thereby.

According to the embodiment of the present invention as described above, to use the disclosed subject matter, a user operates the rehabilitation equipment, and at meantime, the image-capture device to continuously captures images of the specific limbs or a trunk of a user using the rehabilitation equipment. The images are then processed by the machine vision recognition unit to be transformed into characteristic image data that can be analyzed and applied by a host computer belonging to the machine vision recognition unit. Afterward, the host computer transforms the characteristic image data into direction signals and velocity signals with respect to movements of the user's limbs and trunk and outputs the signals to the interactive module. The interactive module further applies the signals to one of the interactive software units so that the movements of the user's specific limbs or a trunk can be further performed in the interactive software of the interactive module. Therefore, the user can operate the rehabilitation equipment according to a series of situational scenes provided by the interactive software.

The present invention integrates the machine vision module composed of the image-capturing device and the machine vision recognition unit with an existing rehabilitation equipment such that the rehabilitation equipment can be connected to an interactive module through the machine vision module without any structural modification. Thereby, a user can operate the rehabilitation equipment actively to train himself/herself on limb or trunk movements. The movements of the limbs or trunk can be further presented to the interactive software unit of the interactive module. Then, the user can operate the rehabilitation equipment in responding to the situational scenes provided by the interactive software.

The present invention implements the machine vision module to transform the images of the movements of the user's limbs and trunk generated when the user operates the rehabilitation equipments into direction signals and velocity signals and afterward outputs the signals to an interactive module. The sensed object is the "user" operating the rehabilitation equipment, but not the rehabilitation equipment itself. Similarly, the direction signals and velocity signals transmitted to the interactive module are related to the "user", but not the rehabilitation equipment itself. Thus, a method for using machine vision to monitor and evaluate a user's rehabilitation result can be derived. The method primarily uses the machine vision module to monitor, check and analyze the movements of a user's specific limbs and trunks, and to evaluate whether the user's movement reaches an anticipative level.

Rehabilitation equipments that may be used in the present invention include, but not limit to, training machines for leg extension, flexion, and swing, training machines for arm extension, flexion, swing, and twist, training machines for body static and dynamic balance, as well as training machines for body flexion, extension, twist and swing. It is to be understood that though the present invention is addressed for purpose of rehabilitation, the concept of the present invention may be also realized by using various exercise apparatuses that can be actively operated by a user.

Known machine vision recognition units have been extensively applied to checking printed circuit boards in electronic industry, checking integrity of packages in food industry, checking spots, indentations or breakage of produced pills or tablets in pharmacy industry, checking car-body finishing and part defects in automobile industry, checking turbine blades in heavy industry, license plate recognition, zip code recognition, bar code reading, fingerprint identification, size classification for fruits and fish products, to observing area variation of bacteria reproduce, etc. Yet it is unprecedented to use a machine vision recognition unit in a rehabilitation system.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A system integrating machine vision, interactive module and rehabilitation equipment, comprising:
   a rehabilitation equipment;
   at least one image-capture device for continuously capturing images of specific limbs or a trunk of a user operating the rehabilitation equipment so as to generate digital image data; and
   a machine vision recognition unit for processing the digital image data into characteristic image data that can be analyzed and used by a host computer belonging to the machine vision recognition unit so that the host computer can transform the characteristic image data into direction signals and velocity signals with respect to movements of the user's limbs and trunk and afterward output the signals to an interactive module,
   wherein, the interactive module receives and processes the direction signals and velocity signals outputted by the machine vision recognition unit so as to present the signals to an interactive software unit of the interactive module, and thereby the interactive module provides a series of situational scenes showing a subject matter moving under control of the movements of the user's limbs and trunk so that the user can operate the rehabilitation equipment according to movement and location of the subject matter in the situational scenes.

2. The system of claim 1, wherein the interactive module comprises multiple interactive software units being compatible with various rehabilitation equipments.

3. The system of claim 1, wherein, the image-capture device is immovably installed on the rehabilitation equipment.

4. The system of claim 1, wherein, the image-capture device is immovably installed at a fixed position around the rehabilitation equipment.

5. The system of claim 1, wherein, the image-capture device is installed on a machine robot and move with the machine robot.

6. The system of claim 1, further comprising at least one light source providing light to where the image-capture device is capturing images for.

7. The system of claim 6, wherein, the light source is an environmental light source.

8. The system of claim 6, wherein, the light source is an external light source settled on the rehabilitation equipment or at a fixed position around the rehabilitation equipment.

9. The system of claim 6, wherein, the light source is an external light source installed on a machine robot so as to move along with the image-capture device.

10. The system of claim 1, wherein, the machine vision recognition unit primarily comprises a digital-image frame buffer, an image processor and a host computer, wherein the digital-image frame buffer is provided for storing the digital image data captured by the image-capture device; the image processor uses the digital image data to generate characteristic image data; the host computer uses the characteristic image data to generate the direction signals and the velocity signals with respect to the movements of the user's limbs and trunk.

11. The system of claim 1, wherein, the rehabilitation equipment allows a user to reciprocally move his/her specific limbs or trunk thereby in an active way.

12. The system of claim 11, wherein, the rehabilitation equipment is a training machine for leg extension, flexion, and/or swing.

13. The system of claim 11, wherein, the rehabilitation equipment is a training machine for arm extension, flexion, and/or swing.

14. The system of claim 11, wherein, the rehabilitation equipment is a training machine for body static and/or dynamic balance.

15. The system of claim 11, wherein, the rehabilitation equipment is a training machine for body flexion, extension, twist and/or swing.

16. A method for using machine vision to monitor and evaluate a user's exercising movements, comprising allowing the user to actively operate an exercise equipment, using the machine vision to monitor, check and analyze the movements of a user's specific limbs and trunks, and using the machine vision to evaluate whether the user's movements reach an anticipative Level, wherein, the interactive module receives and processes the direction signals and velocity signals outputted by the machine vision recognition unit so as to present the signals to an interactive software unit of the interactive module, and thereby the interactive module provides a series of situational scenes showing a subject matter moving under control of the movements of the user's limbs and trunk so that the user can operate the rehabilitation equipment according to movement and location of the subject matter in the situational scenes.

* * * * *